United States Patent
Hai et al.

(10) Patent No.: US 9,535,287 B2
(45) Date of Patent: Jan. 3, 2017

(54) LIQUID CRYSTAL PANEL COMPENSATION STRUCTURE AND LIQUID CRYSTAL DISPLAY APPARATUS

(71) Applicant: Shenzhen China Star Optoelectronics Technology Co., Ltd., Shenzhen, Guangdong (CN)

(72) Inventors: Bo Hai, Guangdong (CN); Chih-tsung Kang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 170 days.

(21) Appl. No.: 14/426,739

(22) PCT Filed: Nov. 12, 2014

(86) PCT No.: PCT/CN2014/090951
§ 371 (c)(1),
(2) Date: Mar. 7, 2015

(87) PCT Pub. No.: WO2016/070450
PCT Pub. Date: May 12, 2016

(65) Prior Publication Data
US 2016/0334662 A1    Nov. 17, 2016

(30) Foreign Application Priority Data

Nov. 5, 2014 (CN) .......................... 2014 1 0616371

(51) Int. Cl.
*G02F 1/13363* (2006.01)
*G02F 1/1335* (2006.01)

(52) U.S. Cl.
CPC ..... *G02F 1/13363* (2013.01); *G02F 1/133528* (2013.01); *G02F 1/133634* (2013.01);
(Continued)

(58) Field of Classification Search
CPC   G02F 1/1335; G02F 1/1333; G02F 1/133345; G02F 1/133634; G02F 1/133524; G02F 1/133528; G02F 1/1336; G02F 1/13363; G02F 1/1393; G02F 1/141; G02F 1/1337; G02F 2201/50; G02F 2001/133531; G02F 2001/13712; G02F 2202/40; G02F 2202/28; G02F 2413/02; G02B 1/105; G02B 5/3083
(Continued)

(56) References Cited

U.S. PATENT DOCUMENTS

2006/0285038 A1* 12/2006 Uchida ............... G02F 1/13363
349/117

FOREIGN PATENT DOCUMENTS

CN        102866537 A      1/2013

* cited by examiner

*Primary Examiner* — Thoi Duong
(74) *Attorney, Agent, or Firm* — Andrew C. Cheng

(57) ABSTRACT

The present invention provides a liquid crystal panel compensation structure comprising two second compensation film disposed at two sides of a liquid crystal panel and a first compensation film disposed above one of the second compensation film; a liquid crystal layer comprising a plurality of liquid crystal molecules being disposed in the liquid crystal panel, a refractive index anisotropy of the liquid crystal layer being $\Delta n$, a depth of the liquid crystal layer being d, and a pretilt angle of the liquid crystal molecules being $\theta$; the first compensation film being a biaxial compensation film, an in-plane compensation value thereof being Ro1, and a depth compensation value thereof being Rth1; each of the second compensation film being an uniaxial compensation film, and the depth compensation value thereof being Rth2, wherein $342.8\ nm \leq \Delta n \cdot d \leq 361.4\ nm$, $85° \leq \theta < 90°$, $52\ nm \leq Ro1 \leq 78\ nm$, $196\ nm \leq Rth1 \leq 293\ nm$, $Y1\ nm \leq Rth2 \leq Y2\ nm$, $Y1 = -0.50645 \cdot Rth1 + 164.1$, and (Continued)

$Y2=-0.003085\cdot(Rth1)2+0.932\cdot Rth1+23.7$. The present invention further provides a liquid crystal display apparatus comprising the compensation structure described above.

18 Claims, 8 Drawing Sheets

(52) U.S. Cl.
CPC ............ *G02F 2001/133531* (2013.01); *G02F 2201/50* (2013.01); *G02F 2202/28* (2013.01); *G02F 2413/02* (2013.01); *G02F 2413/05* (2013.01); *G02F 2413/08* (2013.01)

(58) Field of Classification Search
USPC .................. 349/118, 96, 119, 102, 117, 120, 122,349/130, 134, 136, 138, 65
See application file for complete search history.

LIQUID CRYSTAL PANEL COMPENSATION STRUCTURE AND LIQUID CRYSTAL DISPLAY APPARATUS

FIELD OF THE INVENTION

The present invention relates to a field of liquid crystal display technique, and more particularly to a liquid crystal panel compensation structure and liquid crystal display apparatus.

BACKGROUND OF THE INVENTION

A liquid crystal display (LCD) is a thin flat display apparatus which comprises a certain amount of color or monochrome pixels and is disposed before a light source or a reflecting surface. Because the liquid crystal display has low power consumption and is characterized in high display quality, small size and light weight, it is favored by peoples and becomes a main display apparatus. Nowadays, the major one of the liquid crystal display is the thin film transistor (TFT) liquid crystal display.

As the area of the TFT-LCD being enlarged, a viewing angle is increased, and therefore the contrast and the definition of the image is decreased due to a result of birefringence variation of the liquid crystal molecules in a liquid crystal layer following on variation of the viewing angle. For a normal liquid crystal display panel, the brightness is rapidly decreased (i.e. become darker) and the color is changed when the normal liquid crystal display panel is watched from a certain angle. A conventional liquid crystal display usually provides a 90 degree viewing angle, i.e. 45 degree viewing angle in the left and right side, respectively. The nematic liquid crystal is a substance having birefringence $\Delta n$. The light passing through the liquid crystal molecule is divided into an ordinary ray and an extraordinary ray. If the light is obliquely incident into the liquid crystal molecule, two refracted light would be generated. The birefringence of the light is $\Delta n = ne - no$, wherein ne represents the refractive index of the liquid crystal molecule for the ordinary ray, and no represents the refractive index of the liquid crystal molecule for the extraordinary ray. Therefore, after the light passing through the liquid crystal clamped between the top and bottom glasses, a phase retardation would be occurred on the light. The light characteristic of a liquid crystal cell is measured by the phase retardation $\Delta n \cdot d$, which is so called as optical path difference, wherein $\Delta n$ is the birefringence and d is the depth of the liquid crystal cell. Different phase retardation under different viewing angles is the reason why the problem of viewing angle occurs. A good phase retardation of an optical compensation film could cancel the phase retardation of the nematic liquid crystal, such that the visual angle of the liquid crystal panel can be increased.

The principle of compensation of the optical compensation film is to correct the phase difference generated from the liquid crystal at different viewing angles to symmetrically compensate the birefringence nature of the liquid crystal molecule. By applying the optical compensation film for compensating, light leakage of the dark image can be effectively reduced and the contrast of an image in a certain range of viewing angle can be greatly increased. In view of the function and object of the optical compensation film, the optical compensation film can be divided into a phase difference film that purely changes phases, a chromatic compensation film, a visual angle enlargement film, etc. By applying the optical compensation film, light leakage of the dark image can be effectively reduced, the contrast and chromaticity of an image in a certain range of viewing angle can be greatly improved, and a part of the gray level inversion can be overcome. The main parameters for measuring the characteristic of the optical compensation film comprises an in-plane compensation value Ro in the plane direction, a depth compensation value Rth in the depth direction, the refractive index N and the film depth D, which satisfies the following equation:

$$Ro = (Nx - Ny) \cdot D;$$

$$Rth = [(Nx + Ny)/2 - Nz] \cdot D$$

Wherein, Nx is the refractive index along a slow axis (an axis with a biggest refractive index, i.e. the vibration direction of the light with slower transmitting speed) in the plane of the film, Ny is the refractive index along a fast axis (an axis with a smallest refractive index, i.e. the vibration direction of the light with faster transmitting speed, and is perpendicular to Nx) in the plane of the film, and Nz is the refractive index in the plane direction of the film (perpendicular to Nx and Ny).

For different liquid crystal display mode, i.e. different type of liquid crystal cell, the applied optical compensation film should be different and the values of Ro and Rth should be adjusted to an adequate value. The optical compensation films used in the large scale liquid crystal TV nowadays are mostly for VA (vertical alignment) display mode. The one used in early days is the N-TAC of Konica, and then is continuously developed to the Zeonor of OPTES, the F-TAC series of Fujitsu, the X-plate of Nitto, etc.

For different optical path differences of the liquid crystal, it is necessary to design different optical compensation modes. For a liquid crystal panel with optical path difference in a range between 324.8~361.4 nm, it can be seen from FIG. 1 and FIG. 2, wherein FIG. 1 is an isoluminance contour diagram for wide viewing angle in dark state of a conventional liquid crystal panel after being compensated by a known compensating structure, and FIG. 2 is an equal contrast ratio contour diagram in wide viewing angle of the liquid crystal panel after being compensated by the bilayer-biaxial compensating structure described above. It can be seen from FIG. 1 and FIG. 2 that there is serious light leakage at the position of which the horizontal viewing angles phi are 20~40°, 140~160°, 200~220°, and 310~330° when applying the conventional compensation structure for compensating. The viewing angles where serious light leakage in dark state are much closer to the horizontal viewing angles, and the contrast ratio and definition in these viewing angles are low. However, the relative position between the viewers and the TV determines that the area near the horizontal viewing angles are easier to be seen by the viewers, and therefore the contrast ratio and the definition at these viewing angles make most affection to the viewing effect.

SUMMARY OF THE INVENTION

In view of the drawbacks existed in the conventional technique, the present invention provides a liquid crystal panel compensation structure which can reduce the problem of light leakage in dark state of the liquid crystal panel and increase contrast and definition at large viewing angle through setting compensation value for the liquid crystal panel with optical path difference in a range between 324.8~361.4 nm.

In order to achieve the object described above, the present invention adopts the technique solution as below:

A liquid crystal panel compensation structure comprises two second compensation film disposed at two sides of a liquid crystal panel and a first compensation film disposed above one of the second compensation film; a liquid crystal layer comprising a plurality of liquid crystal molecules is disposed in the liquid crystal panel, a refractive index anisotropy of the liquid crystal layer is Δn, a depth of the liquid crystal layer is d, and a pretilt angle of the liquid crystal molecules is θ; the first compensation film is a biaxial compensation film, an in-plane compensation value thereof is Ro1, and a depth compensation value thereof is Rth1; each of the second compensation film is an uniaxial compensation film, and the depth compensation value thereof is Rth2, wherein 342.8 nm≤$\Delta n \cdot d$≤361.4 nm;

85°≤θ<90°;

52 nm≤$Ro1$≤78 nm;

196 nm≤$Rth1$≤293 nm;

Y1 nm≤$Rth2$≤Y2 nm;

Y1=−0.50645·$Rth1$+164.1; and

Y2=−0.003085·($Rth1$)2+0.932·$Rth1$+23.7.

Wherein, 58 nm≤Ro1≤68 nm, 220 nm≤Rth1≤257 nm, and 67 nm≤Rth2≤103 nm.

Wherein, in the direction away from the liquid crystal panel, a first polarizing film and a first protecting film are further disposed above the first compensation film sequentially, and a second polarizing film and a second protecting film are further disposed on another second compensation film sequentially.

Wherein, a material of the first polarizing film and the second polarizing film is polyvinyl alcohol.

Wherein, a material of the first protecting film and the second protecting film is triacetyl cellulose.

Wherein, an angle between an absorption axis of the first polarizing film and a slow axis of the first compensation film is 90°, and the angle between the absorption axis of the second polarizing film and the slow axis of the another second compensation film is 90°.

Wherein, a first adhesive layer is disposed between the liquid crystal panel and one of the second compensation films, and a second adhesive layer is disposed between the liquid crystal panel and another one of the second compensation films.

Wherein, a material of the first adhesive layer and the second adhesive layer is pressure sensitive adhesive.

Wherein, the liquid crystal panel is a vertical alignment mode liquid crystal panel.

Another aspect of the present invention is to provide a liquid crystal display apparatus comprising a liquid crystal panel and a backlight module, the liquid crystal panel being disposed opposite to the backlight module, and a display light source being provided to the liquid crystal panel from the backlight module so as to display an image by the liquid crystal panel, wherein the liquid crystal panel adopts the liquid crystal panel having the compensation structure stated above.

Compared to the conventional technique, a compensation structure comprising one biaxial compensation film and two uniaxial compensation films is provided in the present invention for the liquid crystal panel with an optical path difference in a range of 342.8~361.4 nm. Through setting the compensation value of the compensation films, the problem of light leakage in the dark state of the liquid crystal panel can be effectively reduced, the contrast and definition at large viewing angle is increased, and the degree of visual range at large viewing angle is improved.

DETAILED DESCRIPTION OF PREFERRED EMBODIMENTS

In order to make the objects, technique solutions and advantages of the present invention be clearer, the present invention will now be described more specifically with reference to the following embodiments with the attached drawings.

Figure 3:
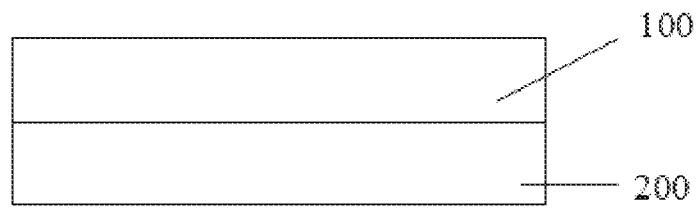
FIG. 3 is an example diagram of a liquid crystal display apparatus provided by the embodiment of the present invention.

As shown in FIG. 3, the liquid crystal display apparatus provided by the present embodiment comprises a liquid crystal panel 100 and a backlight module 200. The liquid crystal panel 100 is disposed opposite to the backlight module 200, and a display light source is provided to the liquid crystal panel 100 from the backlight module 200 so as to display an image by the liquid crystal panel 100, wherein the liquid crystal panel 100 is a liquid crystal panel adopts a compensation structure having one biaxial compensation film and two uniaxial compensation films for performing compensation.

Figure 4:
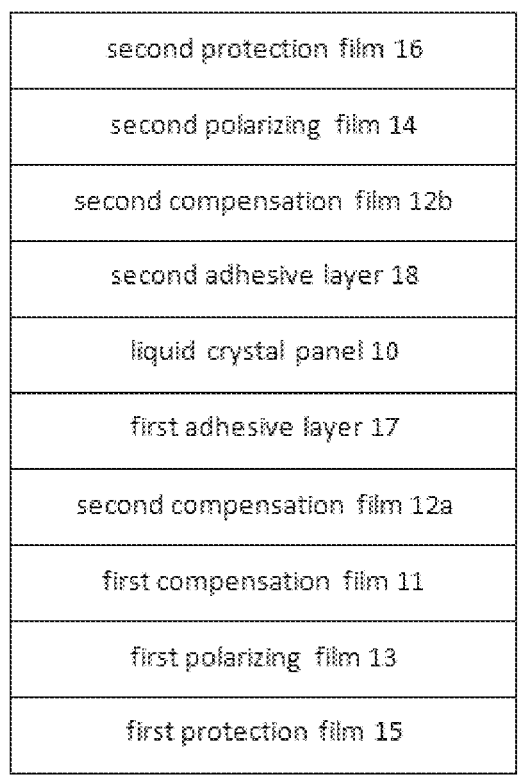
FIG. 4 is an example diagram of a liquid crystal panel provided by the embodiment of the present invention.

Specifically, the liquid crystal panel compensation structure described above is shown in FIG. 4. The liquid crystal panel compensation structure comprises two second compensation films 12a and 12b disposed at two sides of the liquid crystal panel 10, respectively, wherein a first compensation film 11 is disposed above the second compensation film 12a. Furthermore, in the direction away from the liquid crystal panel 10, a first polarizing film 13 and a first protection film 15 are disposed above the first compensation film 11 sequentially, and a second polarizing film 14 and a second protection film 16 are disposed above another second compensation film 12b sequentially. A first adhesive layer 17 is further disposed between the liquid crystal panel 10 and the second compensation film 12a, and a second adhesive layer 18 is further disposed between the liquid crystal panel 10 and the second compensation film 12b.

Wherein, the liquid crystal panel 10 is with vertical alignment cell (VA Cell); a material of the first polarizing film 13 and the second polarizing film 14 is polyvinyl alcohol (PVA), an angle between an absorption axis of the first polarizing film 13 and a slow axis of the first compensation film 11 is set to 90°, and the angle between the absorption axis of the second polarizing film 14 and the slow axis of the second compensation film 12 is set to 90°; a material of the first protecting film 15 and the second protecting material 16 is triacetyl cellulose (TAC), the TAC protecting film 15 and 16 are mainly for protecting the PVA polarizing film 13 and 14 in order to improve a mechanical behavior of the PVA polarizing film 13 and 14 and prevent the PVA polarizing 13 and 14 from retracting; and the material of the first adhesive layer 17 and the second adhesive layer 18 is a pressure sensitive adhesive (PSA).

A liquid crystal layer having a plurality of liquid crystal molecules is disposed in the liquid crystal panel 10, a refractive index anisotropy of the liquid crystal layer is Δn, a depth of the liquid crystal layer is d, and a pretilt angle of the liquid crystal molecules is θ. In the compensation structure stated above, the first compensation film 11 is a biaxial compensation film, an in-plane compensation value thereof is represented by Ro1, and a depth compensation value thereof is represented by Rth1; and each of the two second compensation films 12a and 12b is an uniaxial compensation film, and the depth compensation value thereof is represented by Rth2.

The object of the structure stated above is to achieve the object of effectively reducing the problem of light leakage in the dark state of the liquid crystal panel and increasing the contrast and definition at large viewing angle for the liquid crystal panel with an optical path difference in a range of 342.8~361.4 nm through reasonably setting the compensation values of the first compensation film 11 and the second compensation films 12a and 12b.

During simulation, the settings are proceeded as follows:
First, the liquid crystal layer is set as:
1. The pretilt angle θ is 85°≤θ<90°;
2. The tilt angles of the liquid crystal in the four quadrants are 45°, 135°, 225° and 315°, respectively;
3. The optical path difference Δn·d is 342.8 nm≤Δn·d≤361.4 nm.

Second, the backlight source is set as:
1. The light source: blue light—Yttrium aluminum garnetlight emitting diode (Blue-YAG LED) spectrum;
2. A brightness in the center of the light source is defined to be 100 nit;
3. The distribution of the light source is Lambert's distribution.

Figure 5:
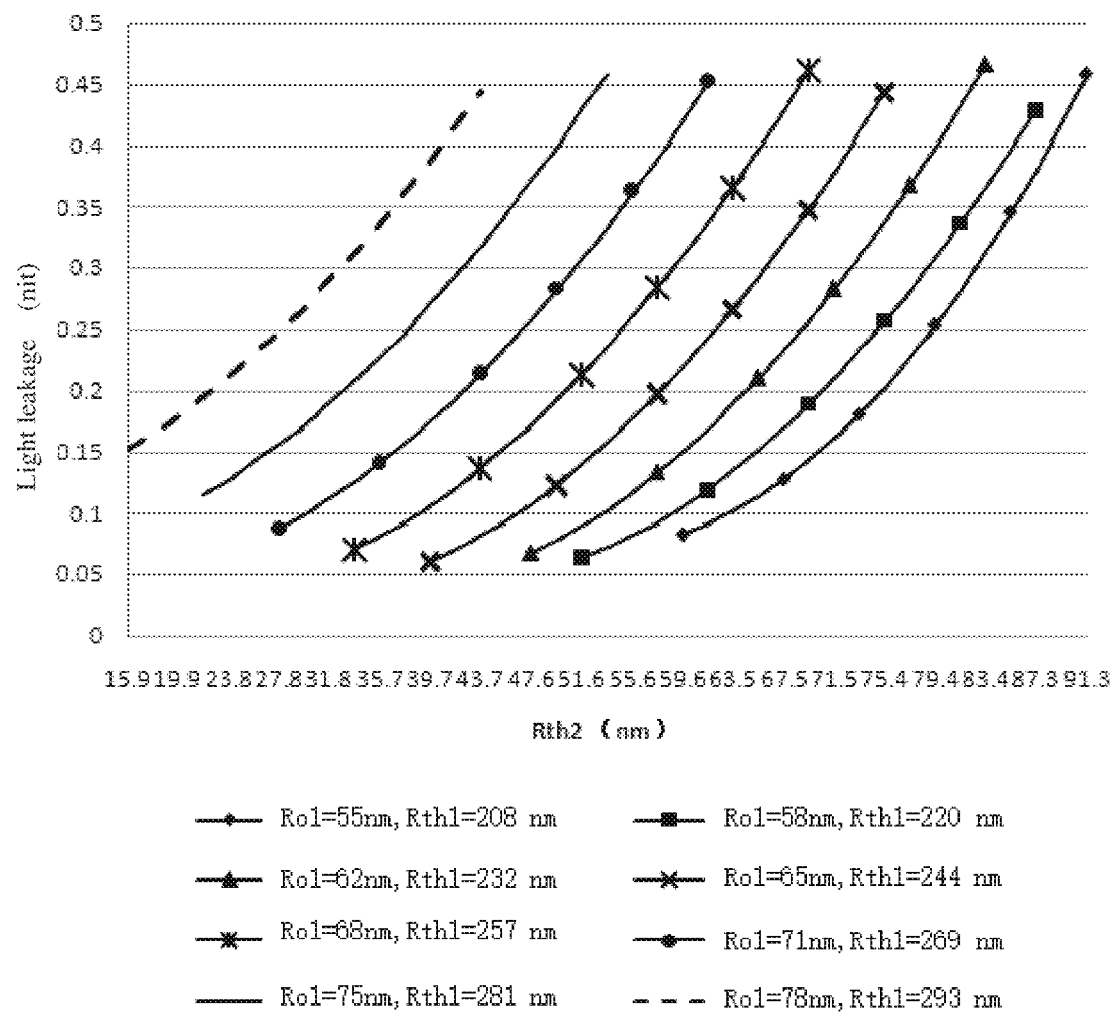
FIG. 5 is a trend diagram of light leakage following on variation of compensation value in dark state of the liquid crystal display apparatus provided by the embodiment of the present invention when the optical path difference of the liquid crystal is 342.8 nm.
Figure 6:
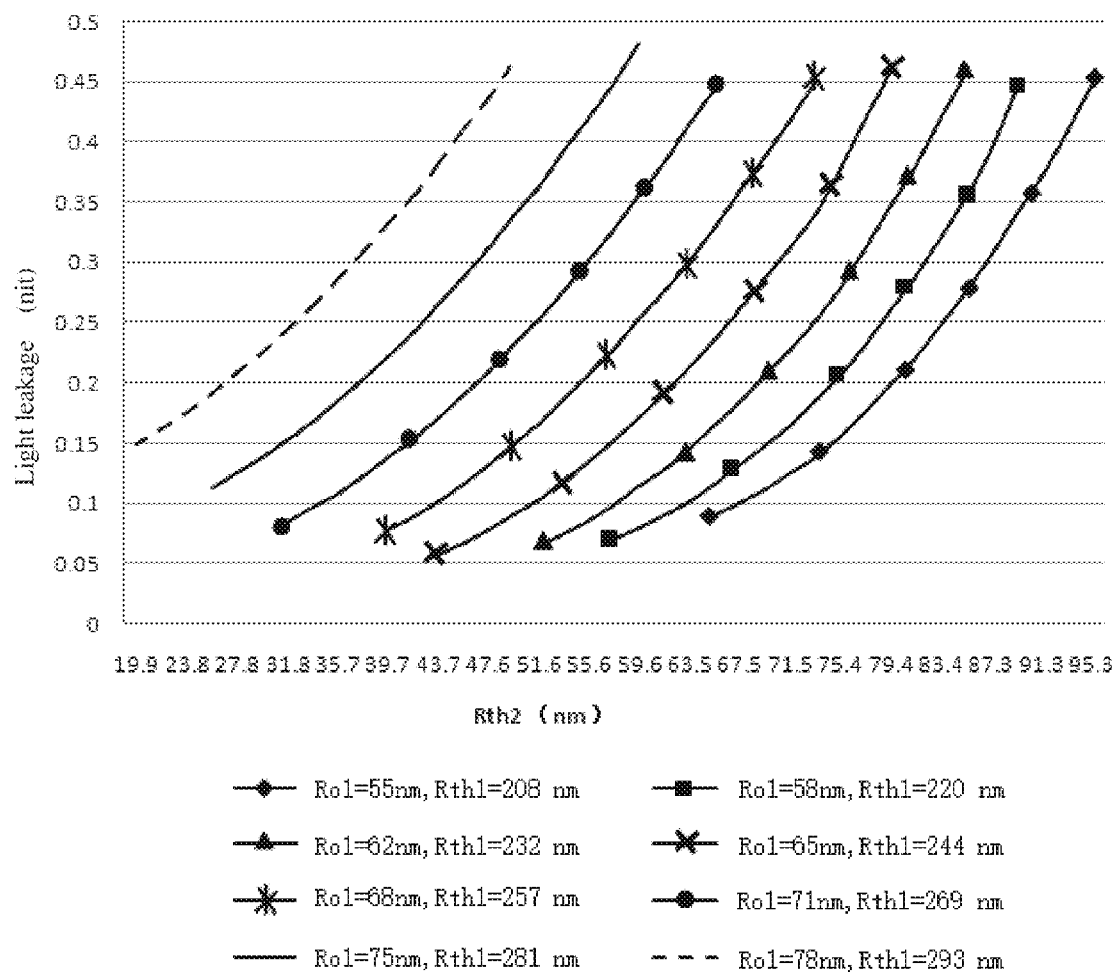
FIG. 6 is a trend diagram of light leakage following on variation of compensation value in dark state of the liquid crystal display apparatus provided by the embodiment of the present invention when the optical path difference of the liquid crystal is 352.1 nm.
Figure 7:
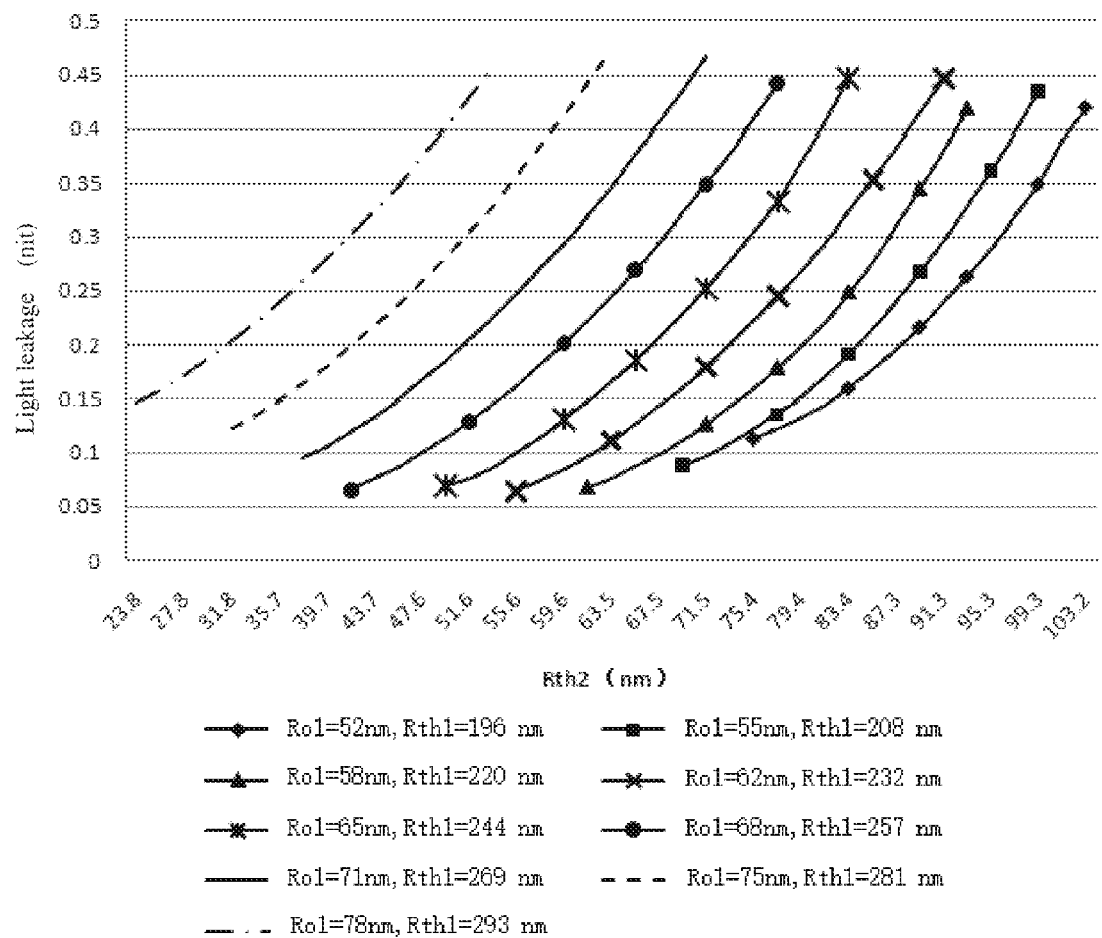
FIG. 7 is a trend diagram of light leakage following on variation of compensation value in dark state of the liquid crystal display apparatus provided by the embodiment of the present invention when the optical path difference of the liquid crystal is 361.4 nm.

Refer to FIG. 5~FIG. 7, FIG. 5 is a trend diagram of light leakage following on variation of compensation value in dark state of the liquid crystal display apparatus provided by the embodiment of the present invention when the optical path difference of the liquid crystal is 342.8 nm and the pretilt angle is 89°; FIG. 6 is a trend diagram of light leakage following on variation of compensation value in dark state of the liquid crystal display apparatus provided by the embodiment of the present invention when the optical path difference of the liquid crystal is 352 nm and the pretilt angle is 89°; and FIG. 7 is a trend diagram of light leakage following on variation of compensation value in dark state of the liquid crystal display apparatus provided by the embodiment of the present invention when the optical path difference of the liquid crystal is 361.4 nm and the pretilt angle is 89°. Wherein, the compensation values of the two second compensation films are the same in the embodiments of the present invention. Therefore, by simulating under accompanying different compensation values with different pretilt angles through the same method, the range of the compensation values corresponding to the first compensation film 11 and the second compensation films 12a and 12b when the light leakage in the dark state is smaller than 0.2 nit and in the range of 342.8 nm≤Δn·d≤361.4 nm and 85°≤θ<90° can be obtained as: 52 nm≤Ro1≤78 nm, 196 nm≤Rth1≤293 nm, and Y1 nm≤Rth2≤Y2 nm; wherein $Y1=-0.50645 \cdot Rth1+164.1$; and $Y2=-0.003085 \cdot (Rth1)^2+0.932 \cdot Rth1+23.7$.

Because a relationship between the compensation values Ro and Rth, refractive index N and depth D of the compensation film is as follows:

$Ro=(Nx-Ny) \cdot D$; and $Rth=[(Nx+Ny)/2-Nz] \cdot D$;

$Nx=Ny$, i.e. $Ro=0$, for an uniaxial compensation film.

Therefore, the compensation values can be changed through the following three method:
1. Changing the depth D to change the compensation values when the refractive index N of the compensation film remains unchanged;
2. Changing the refractive index N to change the compensation values when the depth D of the compensation film remains unchanged; and
3. Changing the depth D and the refractive index N at the same time to change the compensation values when the range of the compensation values is ensured.

Some specific compensation values are selected in the following, and the corresponded compensation results are tested for further describing the technique effects obtained by the technique solutions of the present invention.

Figure 1:
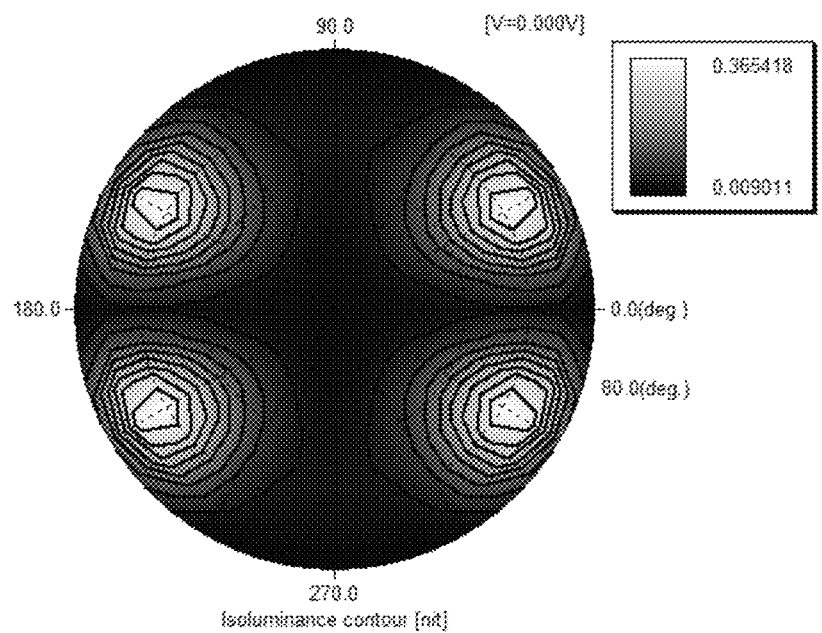
FIG. 1 is an isoluminance contour diagram for wide viewing angle in dark state of a conventional liquid crystal panel.
Figure 2:
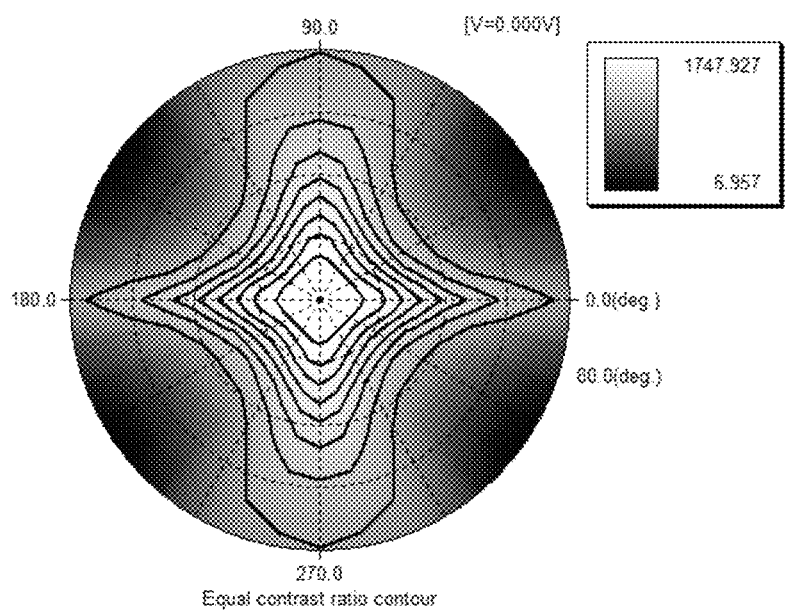
FIG. 2 is an equal contrast ratio contour diagram for wide viewing angle of the liquid crystal panel shown in FIG. 1.
Figure 8:
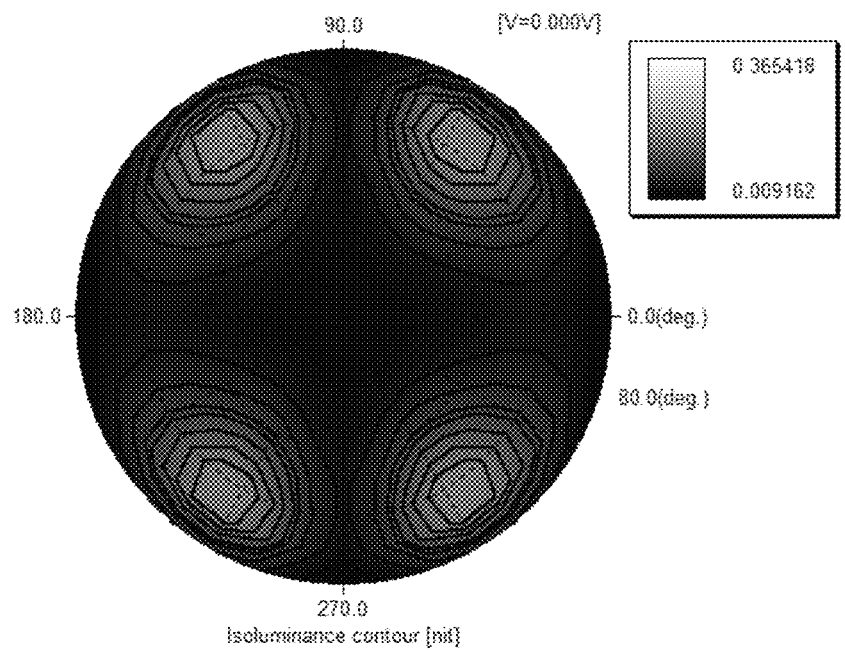
FIG. 8 is an isoluminance contour diagram for wide viewing angle in dark state of a liquid crystal panel after being compensated in an embodiment.
Figure 9:
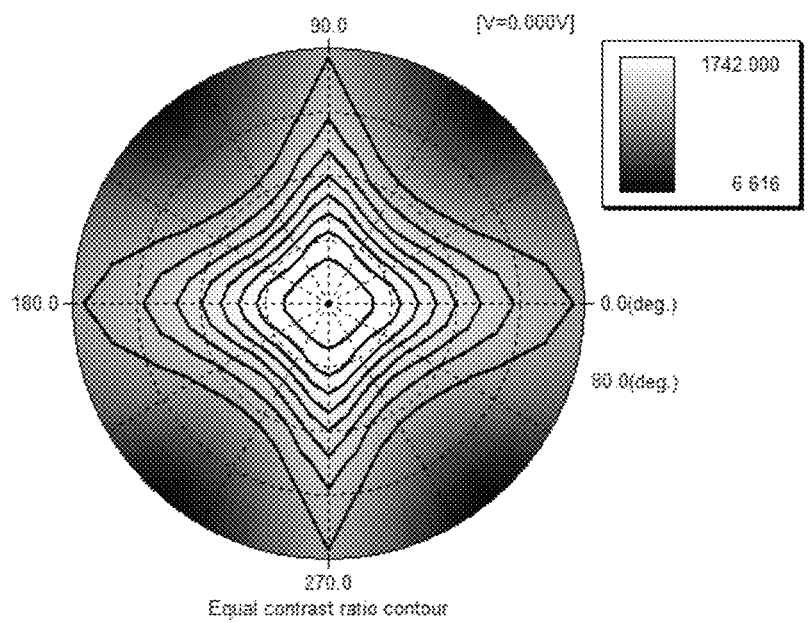
FIG. 9 is an equal contrast ratio contour diagram for wide viewing angle of the liquid crystal panel shown in FIG. 8.

Refer to FIG. 8 and FIG. 9, FIG. 8 is an isoluminance contour diagram for wide viewing angle in dark state of a liquid crystal panel after being compensated in a specific embodiment, and FIG. 9 is an equal contrast ratio contour diagram for wide viewing angle of the liquid crystal panel after being compensated in the specific embodiment. The settings in the FIG. 8 and FIG. 9 are: the optical path difference Δn·d=342.8 nm, the pretilt angle θ=89°, Ro1=58 nm, Rth1=220 nm, Rth2=67 nm. The measured maximum light leakage in the dark state is 0.17 nit. By comparing FIG. 8 and FIG. 1, it can be directly observed that the light leakage in the dark state of the liquid crystal panel after being compensated by the compensation structure of the present embodiment is far less than the light leakage in the dark state of the conventional liquid crystal panel. By comparing FIG. 9 and FIG. 2, it can be directly observed that the contrast distribution for wide viewing angle of the liquid crystal panel after being compensated by the compensation structure of the present embodiment is better than the contrast distribution for wide viewing angle of the conventional liquid crystal panel.

Figure 10:
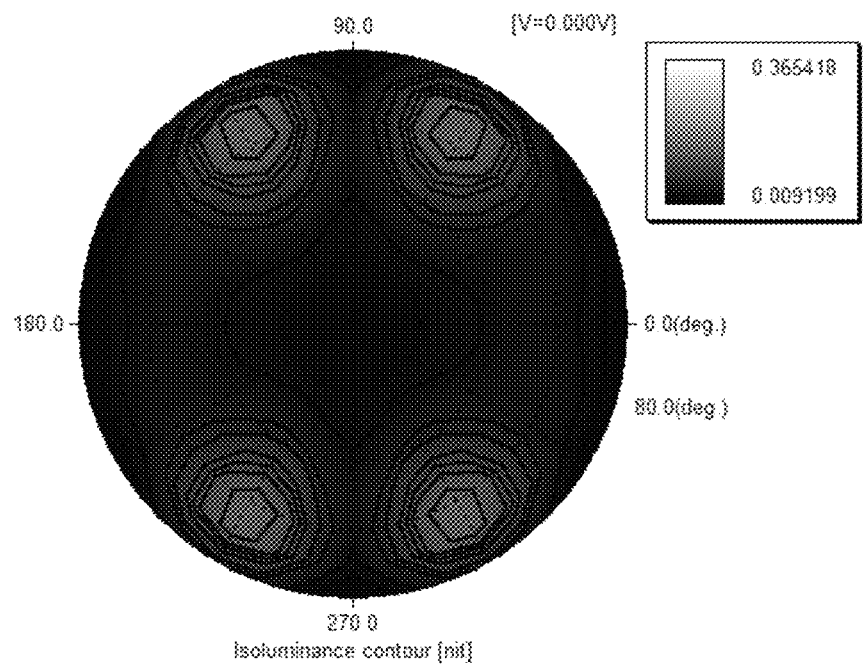
FIG. 10 is an isoluminance contour diagram for wide viewing angle in dark state of a liquid crystal panel after being compensated in another embodiment.
Figure 11:
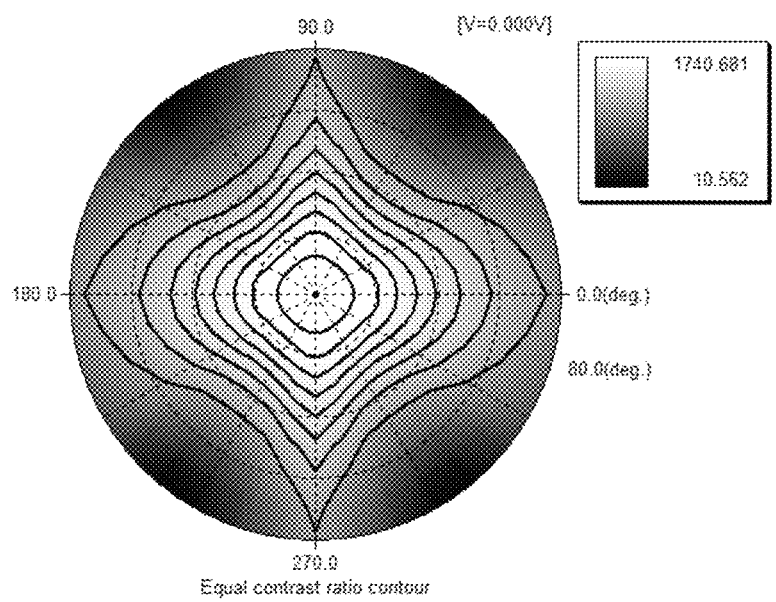
FIG. 11 is an equal contrast ratio contour diagram for wide viewing angle of the liquid crystal panel shown in FIG. 10.

Refer to FIG. 10 and FIG. 11, FIG. 10 is an isoluminance contour diagram for wide viewing angle in dark state of the liquid crystal panel after being compensated in a specific embodiment, and FIG. 11 is an equal contrast ratio contour diagram for wide viewing angle of the liquid crystal panel after being compensated by the specific embodiment. The settings in the FIG. 10 and FIG. 11 are: the optical path difference $\Delta n \cdot d = 352.1$ nm, the pretilt angle $\theta=89°$, Ro1=65 nm, Rth1=244 nm, Rth2=56 nm. The measured maximum light leakage in the dark state is 0.137 nit. By comparing FIG. 10 and FIG. 1, it can be directly observed that the light leakage in the dark state of the liquid crystal panel after being compensated by the compensation structure of the present embodiment is far less than the light leakage in the dark state of the conventional liquid crystal panel. By comparing FIG. 11 and FIG. 2, it can be directly observed that the contrast distribution for wide viewing angle of the liquid crystal panel after being compensated by the compensation structure of the present embodiment is better than the contrast distribution for wide viewing angle of the conventional liquid crystal panel.

Figure 12:
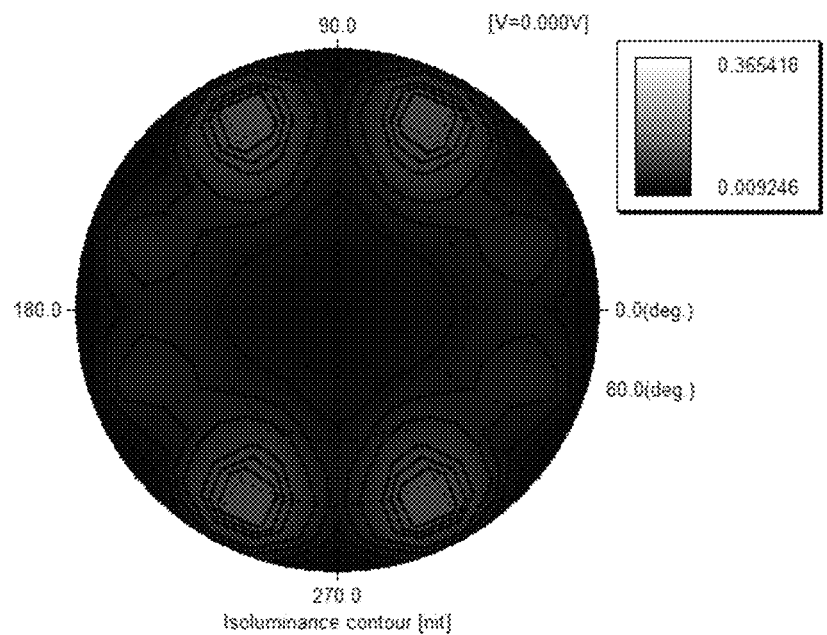
FIG. 12 an isoluminance contour diagram for wide viewing angle in dark state of a liquid crystal panel after being compensated in an other embodiment.
Figure 13:
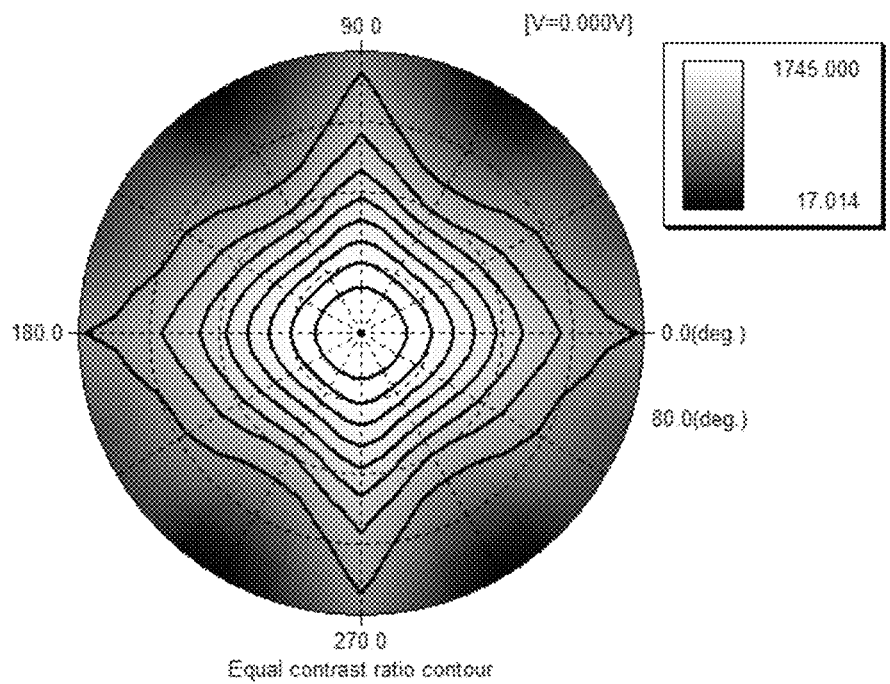
FIG. 13 is an equal contrast ratio contour diagram for wide viewing angle of the liquid crystal panel shown in FIG. 12.

Refer to FIG. 12 and FIG. 13, FIG. 12 is an isoluminance contour diagram for wide viewing angle in dark state of the liquid crystal panel after being compensated in a specific embodiment, and FIG. 13 is an equal contrast ratio contour diagram for wide viewing angle of the liquid crystal panel after being compensated by the specific embodiment. The settings in the FIG. 12 and FIG. 13 are: the optical path difference $\Delta n \cdot d = 361.4$ nm, the pretilt angle $\theta=89°$, Ro1=68 nm, Rth1=257 nm, Rth2=103 nm. The measured maximum light leakage in the dark state is 0.1 nit. By comparing FIG. 12 and FIG. 1, it can be directly observed that the light leakage in the dark state of the liquid crystal panel after being compensated by the compensation structure of the present embodiment is far less than the light leakage in the dark state of the conventional liquid crystal panel. By comparing FIG. 13 and FIG. 2, it can be directly observed that the contrast distribution for wide viewing angle of the liquid crystal panel after being compensated by the compensation structure of the present embodiment is better than the contrast distribution for wide viewing angle of the conventional liquid crystal panel.

The values of optical path difference $\Delta n \cdot d$, the pretilt angle $\theta$, Ro1, Rth1, Ro2 and Rth2 in the three specific embodiments are only examples for explanation. It is proved that when the values of the parameters are in the ranges below, i.e. 52 nm≤Ro1≤78 nm, 196 nm≤Rth1≤293 nm, Y1 nm≤Rth2≤Y2 nm, Y1=−0.50645·Rth1+164.1, and Y2=−0.003085·(Rth1)2+0.932·Rth1+23.7, the technique effect the same as or near the technique effect of the specific embodiments above can be reached.

In summary, through providing a compensation structure comprising one biaxial compensation film and two uniaxial compensation films and setting the compensation value of the compensation films for the liquid crystal panel having smaller optical path difference in the present invention, the problem of light leakage in the dark state of the liquid crystal panel can be effectively reduced, the contrast and definition at large viewing angle is increased, and the degree of visual range at large viewing angle is improved.

It should be noted that, in the present disclosure, the relative terms such as first and second are only for distinguishing one object or operation from another object or operation, but not for requiring the real relationships or orders between these objects or operations. Furthermore, the terms of "comprising", "including" or other variations are meant to cover nonexclusive including, such that the processes, methods, objects or equipment including a plurality of elements do not only include these elements but also include other elements which are non-obviously listed, or include the basic elements which have to be existed in the processes, methods, objects or equipment. Under the situation of no more limitations, the processes, methods, objects or equipment including an element limited by the term of "comprising a . . . " do not exclude the possibility of other existence of the same element therein.

Those described above are the embodiments of the present application. It is noted that various improvements and modifications can be made within the theory of the present application by those with ordinary skill in the technique field, and these improvements and modifications should be included in the protection scope of the present application.

What is claimed is:

1. A liquid crystal panel compensation structure comprising two second compensation films disposed at two sides of a liquid crystal panel and a first compensation film disposed above one of the second compensation films; a liquid crystal layer comprising a plurality of liquid crystal molecules being disposed in the liquid crystal panel, a refractive index anisotropy of the liquid crystal layer being $\Delta n$, a depth of the liquid crystal layer being d, and a pretilt angle of the liquid crystal molecules being $\theta$; the first compensation film being a biaxial compensation film, an in-plane compensation value thereof being Ro1, and a depth compensation value thereof being Rth1; each of the second compensation films being an uniaxial compensation film, and the depth compensation value thereof being Rth2, wherein 342.8 nm≤$\Delta n \cdot d$≤361.4 nm;

85°≤$\theta$<90°;

52 nm≤$Ro$1≤78 nm;

196 nm≤$Rth$1≤293 nm;

$Y$1 nm≤$Rth$2≤$Y$2 nm;

$Y$1=−0.50645·$Rth$1+164.1; and $Y$2=−0.003085·($Rth$1)$^2$+0.932·$Rth$1+23.7.

2. The liquid crystal panel compensation structure according to claim 1, wherein 58 nm≤Ro1≤68 nm, 220 nm≤Rth1≤257 nm, and 67 nm≤Rth2≤103 nm.

3. The liquid crystal panel compensation structure according to claim 1, wherein, in a direction away from the liquid crystal panel, a first polarizing film and a first protecting film are further disposed above the first compensation film sequentially, and a second polarizing film and a second protecting film are further disposed on another second compensation film sequentially.

4. The liquid crystal panel compensation structure according to claim 3, wherein a material of the first polarizing film and the second polarizing film is polyvinyl alcohol.

5. The liquid crystal panel compensation structure according to claim 3, wherein a material of the first protecting film and the second protecting film is triacetyl cellulose.

6. The liquid crystal panel compensation structure according to claim 3, wherein an angle between an absorption axis of the first polarizing film and a slow axis of the first compensation film is 90°, and the angle between the absorption axis of the second polarizing film and the slow axis of the another second compensation film is 90°.

7. The liquid crystal panel compensation structure according to claim 1, wherein a first adhesive layer is disposed between the liquid crystal panel and one of the second compensation films, and a second adhesive layer is disposed between the liquid crystal panel and another one of the second compensation films.

8. The liquid crystal panel compensation structure according to claim 7, wherein a material of the first adhesive layer and the second adhesive layer is pressure sensitive adhesive.

9. The liquid crystal panel compensation structure according to claim 1, wherein the liquid crystal panel is a vertical alignment mode liquid crystal panel.

10. A liquid crystal display apparatus, comprising a liquid crystal panel and a backlight module, the liquid crystal panel being disposed opposite to the backlight module and a display light source being provided to the liquid crystal panel from the backlight module so as to display an image by the liquid crystal panel, wherein a compensation structure is set in the liquid crystal panel, and the compensation structure comprises two second compensation films disposed at two sides of a liquid crystal panel and a first compensation film disposed above one of the second compensation films; a liquid crystal layer comprising a plurality of liquid crystal molecules is disposed in the liquid crystal panel, a refractive index anisotropy of the liquid crystal layer is $\Delta n$, a depth of the liquid crystal layer is d, and a pretilt angle of the liquid crystal molecules is $\theta$; the first compensation film is a biaxial compensation film, an in-plane compensation value thereof is Ro1, and a depth compensation value thereof is Rth1; each of the second compensation films is an uniaxial compensation film, and the depth compensation value thereof is Rth2, wherein $342.8 \text{ nm} \leq \Delta n \cdot d \leq 361.4 \text{ nm}$, $85° \leq \theta < 90°$;

$52 \text{ nm} \leq Ro1 \leq 78 \text{ nm}$;

$196 \text{ nm} \leq Rth1 \leq 293 \text{ nm}$, $Y1 \text{ nm} \leq Rth2 \leq Y2 \text{ nm}$;

$Y1 = -0.50645 \cdot Rth1 + 164.1$; and $Y2 = -0.003085 \cdot (Rth1)^2 + 0.932 \cdot Rth1 + 23.7$.

11. The liquid crystal display apparatus according to claim 10, wherein 58 nm≤Ro1≤68 nm, 220 nm≤Rth1≤257 nm, and 67 nm≤Rth2≤103 nm.

12. The liquid crystal display apparatus according to claim 10, wherein a first polarizing film and a first protecting film are further disposed above the first compensation film sequentially, and a second polarizing film and a second protecting film are further disposed on another second compensation film sequentially.

13. The liquid crystal display apparatus according to claim 12, wherein a material of the first polarizing film and the second polarizing film is polyvinyl alcohol.

14. The liquid crystal display apparatus according to claim 12, wherein a material of the first protecting film and the second protecting film is triacetyl cellulose.

15. The liquid crystal display apparatus according to claim 12, wherein an angle between an absorption axis of the first polarizing film and a slow axis of the first compensation film is 90°, and the angle between the absorption axis of the second polarizing film and the slow axis of the another second compensation film is 90°.

16. The liquid crystal display apparatus according to claim 10, wherein a first adhesive layer is disposed between the liquid crystal panel and one of the second compensation films, and a second adhesive layer is disposed between the liquid crystal panel and another one of the second compensation films.

17. The liquid crystal display apparatus according to claim 16, wherein a material of the first adhesive layer and the second adhesive layer is pressure sensitive adhesive.

18. The liquid crystal display apparatus according to claim 10, wherein the liquid crystal panel is a vertical alignment mode liquid crystal panel.

* * * * *